(12) United States Patent
Tanaka

(10) Patent No.: US 11,410,444 B2
(45) Date of Patent: Aug. 9, 2022

(54) INFORMATION PROCESSING APPARATUS AND NON-TRANSITORY COMPUTER READABLE MEDIUM FOR ARRANGING TABLE IMAGE AND RECOGNITION RESULT

(71) Applicant: FUJIFILM BUSINESS INNOVATION CORP., Tokyo (JP)

(72) Inventor: Takumi Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 15 days.

(21) Appl. No.: 17/018,290

(22) Filed: Sep. 11, 2020

(65) Prior Publication Data

US 2021/0224529 A1 Jul. 22, 2021

(30) Foreign Application Priority Data

Jan. 21, 2020 (JP) .............................. JP2020-007235

(51) Int. Cl.
| | | |
|---|---|---|
| *G06F 40/00* | (2020.01) | |
| *G06V 30/412* | (2022.01) | |
| *G06F 40/177* | (2020.01) | |
| *G06F 40/103* | (2020.01) | |
| *G06F 40/106* | (2020.01) | |
| *G06V 30/414* | (2022.01) | |

(52) U.S. Cl.
CPC .......... *G06V 30/412* (2022.01); *G06F 40/103* (2020.01); *G06F 40/106* (2020.01); *G06F 40/177* (2020.01); *G06V 30/414* (2022.01)

(58) Field of Classification Search
CPC ............ G06K 9/00449; G06K 9/00463; G06F 40/103; G06F 40/106; G06F 40/177; G06V 30/412
See application file for complete search history.

(56) References Cited

U.S. PATENT DOCUMENTS

| | | | | |
|---|---|---|---|---|
| 5,420,695 | A * | 5/1995 | Ohta ................... | G06K 9/00449 358/401 |
| 6,628,832 | B2 | 9/2003 | Kanatsu | |
| 10,607,381 | B2 * | 3/2020 | Yamazaki ............. | G06T 11/001 |
| 2003/0123727 | A1 * | 7/2003 | Kanatsu ............. | G06K 9/00449 382/173 |
| 2008/0040655 | A1 * | 2/2008 | Tanaka ............... | G06K 9/00449 715/228 |
| 2009/0110282 | A1 * | 4/2009 | Tanaka ................... | G06K 9/033 382/181 |
| 2010/0008578 | A1 * | 1/2010 | Eguchi ............... | G06K 9/00449 382/175 |
| 2017/0116179 | A1 * | 4/2017 | Gagne-Langevin ........................ | G06F 40/226 |
| 2017/0262722 | A1 * | 9/2017 | Nanaumi ............ | G06F 3/04886 |

(Continued)

FOREIGN PATENT DOCUMENTS

| | | |
|---|---|---|
| JP | 2000-090195 A | 3/2000 |
| JP | 2013-12223 A | 1/2013 |

*Primary Examiner* — Scott T Baderman
*Assistant Examiner* — Barbara M Level
(74) *Attorney, Agent, or Firm* — Oliff PLC

(57) ABSTRACT

An information processing apparatus includes a processor. The processor is configured to acquire a recognition result of a table image containing a table; and perform control such that a screen on which the table image and the recognition result are arranged for each row or column of the table in an alternate manner is displayed.

11 Claims, 8 Drawing Sheets

(56) References Cited

U.S. PATENT DOCUMENTS

2019/0171704 A1*  6/2019  Buisson ............. G06K 9/00449
2021/0042555 A1*  2/2021  Odate ................ G06K 9/344
2021/0209297 A1*  7/2021  Dong ................. G06F 40/18

* cited by examiner

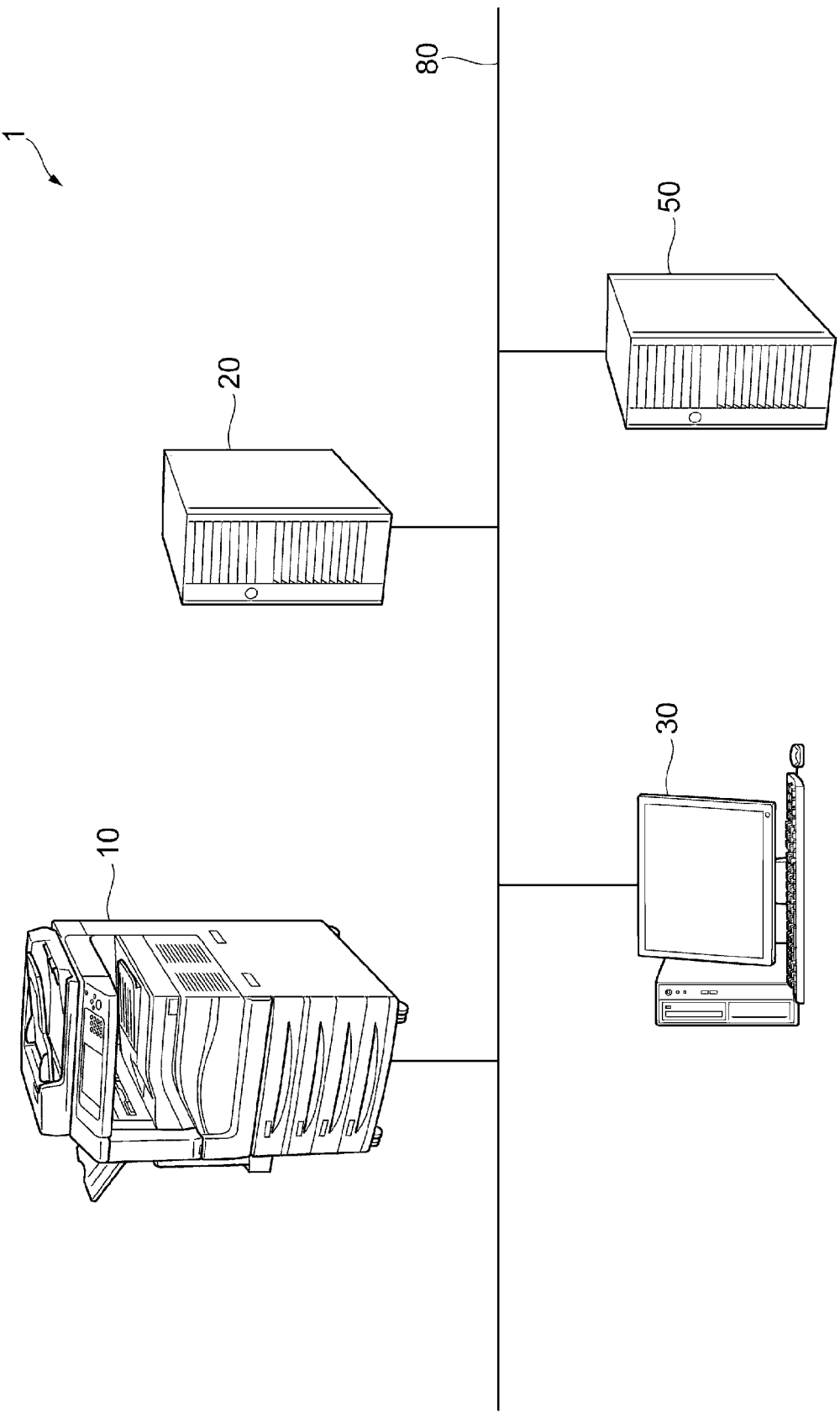

FIG. 2A

```
<Zone left="500" top="3000" right="2000" bottom="3750"/>
<Table sizex="1500" sizey="750" cellnum="22">
<Cell no="0" left="0" top="0" right="300" bottom="150" name="A1"/>
<Cell no="1" left="300" top="0" right="600" bottom="150" name="M2"/>
<Cell no="2" left="600" top="0" right="900" bottom="150" name="A3"/>
<Cell no="3" left="900" top="0" right="1200" bottom="150" name="A4"/>
<Cell no="4" left="0" top="150" right="300" bottom="300" name="B1"/>
<Cell no="5" left="300" top="150" right="600" bottom="300" name="B2"/>
<Cell no="6" left="600" top="150" right="900" bottom="300" name=""/>
<Cell no="7" left="900" top="150" right="1200" bottom="300" name="B3"/>
<Cell no="8" left="1200" top="150" right="1500" bottom="300" name="B4"/>
...
</Table>
</Zone>
```

| A1 | M2 | A3 | A4 |
|----|----|----|----|
| B1 | B2 |    | B3 | B4 |
| C1 | C2 | C3 | C4 |
| D1 | D2 | D3 | D  |
| E1 | E2 | E3 | E4 | 4 |

ISSUED TO

| ISSUED FROM | | | |
|---|---|---|---|
| A1 | A2 | A3 | A4 |
| B1 | B2 | B3 | B4 |
| C1 | C2 | C3 | C4 |
| D1 | D2 | D3 | D4 |
| E1 | E2 | E3 | E4 |
| F1 | F2 | F3 | F4 |

FIG. 3B

ISSUED FROM

| A1 | A2 | A3 | A4 |
|---|---|---|---|

| B1 | B2 | B3 | B4 |
|---|---|---|---|

| C1 | C2 | C3 | C4 |
|---|---|---|---|

| D1 | D2 | D3 | D4 |
|---|---|---|---|

| E1 | E2 | E3 | E4 |
|---|---|---|---|

| F1 | F2 | F3 | F4 |
|---|---|---|---|

INFORMATION PROCESSING APPARATUS AND NON-TRANSITORY COMPUTER READABLE MEDIUM FOR ARRANGING TABLE IMAGE AND RECOGNITION RESULT

CROSS-REFERENCE TO RELATED APPLICATIONS

This application is based on and claims priority under 35 USC 119 from Japanese Patent Application No. 2020-007235 filed Jan. 21, 2020.

BACKGROUND

(i) Technical Field

The present disclosure relates to an information processing apparatus and a non-transitory computer readable medium.

(ii) Related Art

An image processing apparatus that recognizes a place filled in by a user in an image obtained by reading a paper document filled in by the user has been known (see, for example, Japanese Unexamined Patent Application Publication No. 2013-012223). The image processing apparatus sets in advance a region where a written mark is to be recognized in the place filled in, recognizes the mark in the region in the image as a recognition target, based on the set region, generates an object representing a recognition result for the region where the mark is recognized, and displays the generated object at a position corresponding to the region where the mark is recognized, in a superimposed manner.

A table recognition apparatus has also been known (see, for example, Japanese Unexamined Patent Application Publication No. 2000-090195). The table recognition apparatus analyzes regions and positions of items in a table, based on the arrangement state of ruled lines and character strings contained in an image of the table to acquire a table structure, displays the acquired table structure, issues an instruction to correct a region of an item in the displayed table structure, corrects the region and position of the item in accordance with the correction instruction to acquire a corrected table structure, performs character recognition on each of the items in the corrected table structure, and generates table format data based on a result of the character recognition and the table structure.

SUMMARY

An operator may check and correct a recognition result of recognition of a table image containing a table. In the case where the operator causes the recognition result having the original table structure to be displayed independent of the table image and compares the table image with the recognition result, the operator needs to check the recognition result while coming and going between the table image and the recognition result because the table image and the recognition result are displayed apart from each other. Thus, such a checking operation is troublesome to the operator.

Aspects of non-limiting embodiments of the present disclosure relate to reducing the labor of an operator for comparing a table image with a recognition result, compared to a case where a recognition result of a table image containing a table is displayed with an original table structure.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to acquire a recognition result of a table image containing a table; and perform control such that a screen on which the table image and the recognition result are arranged for each row or column of the table in an alternate manner is displayed.

BRIEF DESCRIPTION OF THE DRAWINGS

Exemplary embodiments of the present disclosure will be described in detail based on the following figures, wherein:

FIG. 1 is a diagram illustrating an example of the entire configuration of a form processing system according to an exemplary embodiment of the present disclosure;

FIGS. 2A and 2B are diagrams illustrating how a recognition result correction apparatus configurates a table region based on a form recognition result;

FIGS. 3A and 3B are diagrams illustrating how the recognition result correction apparatus cuts out a table region from a form image and rearranges the table region;

DETAILED DESCRIPTION

Figure 4B:
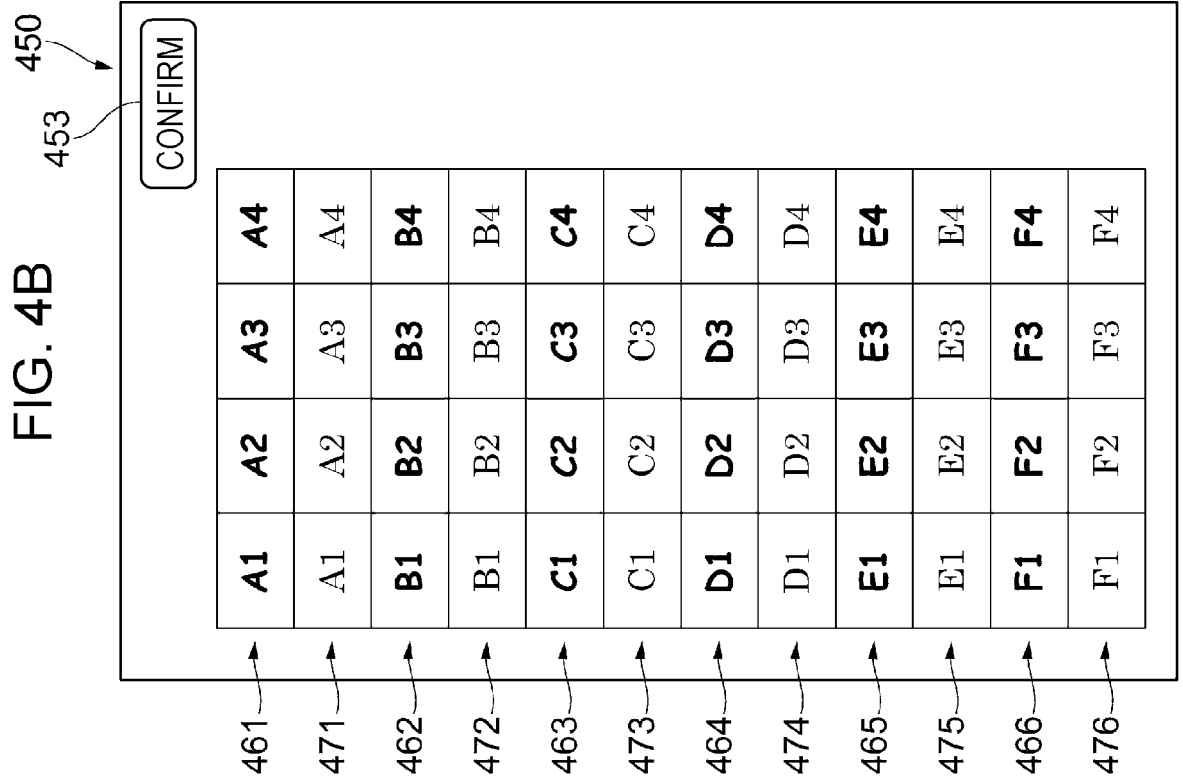
FIGS. 4A and 4B are diagrams illustrating examples of a correction screen displayed on the recognition result correction apparatus.

Hereinafter, exemplary embodiments of the present disclosure will be described in detail with reference to the attached drawings.

Entire Configuration of Form Processing System

FIG. 1 is a diagram illustrating an example of the entire configuration of a form processing system 1 according to an exemplary embodiment of the present disclosure. As illustrated in FIG. 1, the form processing system 1 includes an image reading apparatus 10, a form recognition apparatus 20, a recognition result correction apparatus 30, and a form processing apparatus 50 that are connected to one another by a communication line 80. In FIG. 1, an image reading apparatus 10, a form recognition apparatus 20, a recognition result correction apparatus 30, and a form processing apparatus 50 are illustrated. However, two or more image reading apparatuses 10, two or more form recognition apparatuses 20, two or more recognition result correction apparatuses 30, and two or more form processing apparatuses 50 may be provided.

The image reading apparatus 10 is an apparatus that reads an image recorded on a recording medium such as paper. The image reading apparatus 10 is, for example, a scanner. The image reading apparatus 10 of a charge coupled devices (CCD) type that reduces, with a lens, reflected light for light applied to a document from a light source and receives, with a CCD, the reduced reflected light, a contact image sensor (CIS) type that receives, with a CIS, reflected light for light sequentially applied to a document from a light-emitting diode (LED) light source, or the like may be used. In an exemplary embodiment, the image reading apparatus 10 reads a form, in particular, that includes a fill-in field in which a symbol such as a character, number, or the like is handwritten or printed.

The form recognition apparatus 20 is an apparatus that recognizes fill-in fields and symbols such as characters and numbers filled in the fill-in fields of a form read by the image reading apparatus 10. In particular, in the case where fill-in fields form a table structure, the form recognition apparatus 20 recognizes the table structure.

The recognition result correction apparatus 30 is an apparatus that corrects a result of recognition of a form by the form recognition apparatus 20 (hereinafter, referred to as a form recognition result). The recognition result correction apparatus 30 displays a correction screen for correcting a form recognition result. When a user performs an operation for correcting a form recognition result on the correction screen, the recognition result correction apparatus 30 corrects the form recognition result.

The form processing apparatus 50 is an apparatus that performs predetermined processing on a form recognition result obtained by the form recognition apparatus 20 or a corrected form recognition result obtained by the recognition result correction apparatus 30, the corrected form recognition result being obtained by correcting the form recognition result obtained by the form recognition apparatus 20. The predetermined processing includes, for example, processing for storing an item associated with a fill-in field of a form and text data obtained by recognizing characters or the like filled in the fill-in field in association with each other into a database.

Outline of Exemplary Embodiment

In an exemplary embodiment, the recognition result correction apparatus 30 displays a screen on which a table image containing a table and a recognition result of the table image are arranged for each row or column of the table in an alternate manner. A case where a screen on which a table image containing a table and a recognition result of the table image are arranged for each row of the table in an alternate manner is displayed and a case where a screen on which a table image containing a table and a recognition result of the table image are arranged for each column of the table in an alternate manner is displayed are the same with the exception of the difference between rows and columns. Therefore, only the former case will be described below. By replacing rows with columns in the former case, the latter case is obtained. That is, hereinafter, in an exemplary embodiment, "row" will be replaced with "row or column".

FIGS. 2A and 2B are diagrams illustrating how the recognition result correction apparatus 30 configurates a table region based on a form recognition result 410. The table region configurated as illustrated in FIG. 2B will be referred to as a "table recognition result 420".

FIG. 2A illustrates an example of the form recognition result 410 that the recognition result correction apparatus 30 has acquired from the form recognition apparatus 20. As illustrated in FIG. 2A, the form recognition result 410 is described in, for example, eXtensible Markup language (XML).

In the form recognition result 410, description rows 411 to 414 represent recognition results of the first row of the table. Specifically, four cells are recognized from the first row of the table. Characters "A1", "M2", "A3", and "A4" are recognized from the first cell, the second cell, the third cell, and the fourth cell, respectively.

Furthermore, description rows 415 to 419 represent recognition results of the second row of the table. Specifically, five cells are recognized from the second row of the table. Characters "B1" and "B2" are recognized from the first cell and the second cell, respectively, no character is recognized from the third cell, and characters "B3" and "B4" are recognized from the fourth cell and the fifth cell, respectively.

FIG. 2B illustrates an example of the table recognition result 420 configurated based on the form recognition result 410 by the recognition result correction apparatus 30.

As illustrated in FIG. 2B, a row recognition result 421 of the table recognition result 420 includes four cells in accordance with the description rows 411 to 414 in FIG. 2A, and the characters "A1", "M2", "A3", and "A4" are set in the first cell, the second cell, the third cell, and the fourth cell, respectively.

A row recognition result 422 of the table recognition result 420 includes five cells in accordance with the description rows 415 to 419 in FIG. 2A, and the characters "B1" and "B2" are set in the first cell and the second cell, respectively, no character is set in the third cell, and the characters "B3" and "B4" are set in the fourth cell and the fifth cell, respectively.

In FIG. 2A, description rows corresponding to a row recognition result 423 of the table recognition result 420 are not illustrated. The row recognition result 423 includes four cells, and the characters "C1", "C2", "C3", and "C4" are set in the first cell, the second cell, the third cell, and the fourth cell, respectively.

In FIG. 2A, description rows corresponding to a row recognition result 424 of the table recognition result 420 are not illustrated. The row recognition result 424 includes five cells, and characters "D1", "D2", "D3", "D", and "4" are set in the first cell, the second cell, the third cell, the fourth cell, and the fifth cell, respectively.

In FIG. 2A, description rows corresponding to a row recognition result 425 of the table recognition result 420 are not illustrated. The row recognition result 425 includes four cells, and characters "E1", "E2", "E3", and "E4" are set in the first cell, the second cell, the third cell, and the fourth cell, respectively.

FIGS. 3A and 3B are diagrams illustrating how the recognition result correction apparatus 30 cuts out an image of a table region from a form image 430 and rearranges the image. The image of the table region cut out as illustrated in FIG. 3B will be referred to as a "table region image 440".

FIG. 3A illustrates an example of the form image 430 that the recognition result correction apparatus 30 has acquired from the image reading apparatus 10. In the form image 430, a range 431 of the table recognition result 420 illustrated in FIG. 2B is also illustrated. That is, in this example, the range 431 of the table recognition result 420 contains a region in which no cell of the table is present, and the range 431 of the table recognition result 420 does not contain the sixth row of the table. This is because there is a row mistakenly recognized as including five cells and the sixth row is not recognized.

FIG. 3B illustrates an example of the table region image 440 cut out for individual rows from the form image 430 and rearranged by the recognition result correction apparatus 30. The recognition result correction apparatus 30 cuts out row region images 441 to 445 corresponding to the row recognition results 421 to 425 in FIG. 2B, respectively.

The recognition result correction apparatus 30 does not delete an image of a region other than the table from the form image 430. Some parts of the image of the region other than the table are not deleted. Specifically, instead of cutting out only an image of the table, an image of a region around the table as well as the image of the table is cut out. As the image of the region around the table, an image of a region corresponding to a predetermined ratio of the size of the table may be considered. As described above, by cutting out the image of the region around the table as well, a situation in which a part to be compared with the image of the table is lost due to mistakenly recognizing the number of columns at the time of cutting out the image of the table may be avoided. In FIG. 3B, as the image of the region around the table, a region image 441a, region images 441b to 445b, region images 441c to 445c, and a region image 445d are cut out. As described above, an image of a region corresponding to the predetermined ratio of the size of the table is set as the image of the region around the table. However, in this example, because the width of the form image 430 is limited, the ratio of the region image 441a and the region image 445d is higher than the ratio of the region images 441b to 445b and the region images 441c to 445c. Furthermore, to insert the row recognition result 425 below the row region image 445 as described below, the region image 445d is separated from the row region image 445.

Figure 4A:
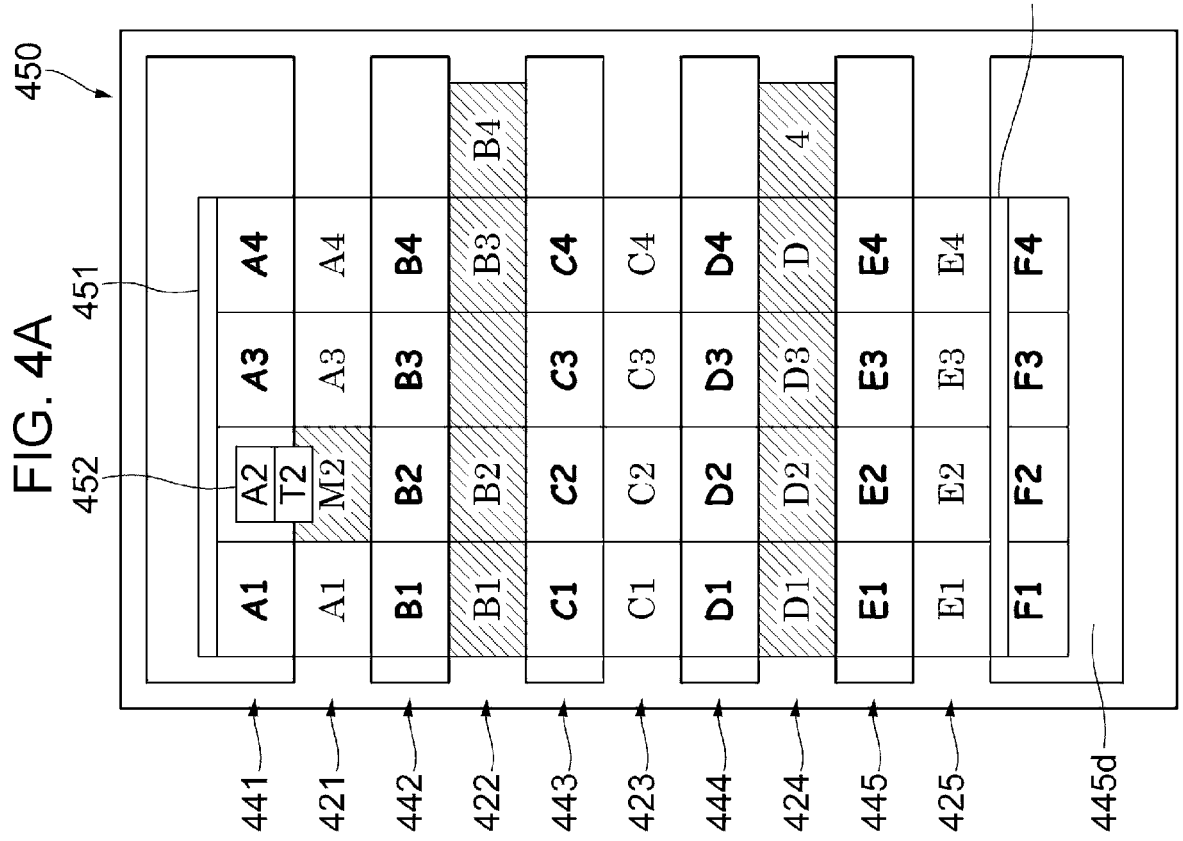

FIGS. 4A and 4B are diagrams illustrating examples of a correction screen 450 displayed on the recognition result correction apparatus 30. The correction screen 450 is a screen used by a user to correct the table recognition result 420.

FIG. 4A illustrates the correction screen 450 displayed before a user performs correction. The recognition result correction apparatus 30 generates the correction screen 450 by inserting the row recognition results 421 to 425 illustrated in FIG. 2B into between the row region images 441 to 445 and the region image 445d illustrated in FIG. 3B. In the case where there is an inconsistency in the structure of the table or in recognition results of characters between the row region images 441 to 445 and the row recognition results 421 to 425, the recognition result correction apparatus 30 highlights a part where the inconsistency is present. After the inconsistency is eliminated, highlighting is removed. In FIGS. 4A and 4B, highlighting is represented by diagonal hatching.

Specifically, because the reliability of a recognition result of characters in the second cell of the row recognition result 421 is low, this cell is highlighted. In this case, when a user performs an operation on the highlighted cell, the recognition result correction apparatus 30 displays a correction candidate display field 452 including correction candidates for the recognition result. Then, the user performs an operation for selecting one of the correction candidates included in the correction candidate display field 452 and correcting the original recognition result of the characters.

Furthermore, the row recognition result 422 is supposed to include four cells but actually includes five cells, and the entire row corresponding to the row recognition result 422 is highlighted. In this case, the user performs an operation for deleting the third cell in which no character is set, so that the number of cells is corrected to four.

Furthermore, the row recognition result 424 is supposed to include four cells but actually includes five cells, and the entire row corresponding to the row recognition result 424 is highlighted. In this case, the user performs an operation for merging the fourth cell with the fifth cell, characters being set in the fourth cell and the fifth cell in a separated manner, so that the number of cells is corrected to four.

The recognition result correction apparatus 30 displays a row addition mark 451 above the image of the first row of the row region image 441. In the case where no row above the first row is recognized, the user operates the row addition mark 451 to add a row not recognized.

Furthermore, the recognition result correction apparatus 30 also displays a row addition mark 455 below the image of the fifth row of the row recognition result 425. In the case where no row below the fifth row is recognized, the user operates the row addition mark 455 to add a row not recognized. In this example, the sixth row is not recognized. Thus, the user operates the row addition mark 455 to add the sixth row.

FIG. 4B illustrates the correction screen 450 displayed after the user performs correction as described above. By arranging row images 461 to 465 cut out from the form image 430 illustrated in FIG. 3A in accordance with corrected row recognition results 471 to 475 obtained by correcting the row recognition results 421 to 425 in FIG. 4A and the corrected row recognition results 471 to 475 in an alternate manner, the recognition result correction apparatus 30 generates the correction screen 450 obtained after correction. When the user performs an operation for pressing a confirm button 453, the recognition result correction apparatus 30 displays a correction confirmation screen 470 for confirming the corrected table recognition result 420.

Figure 5:
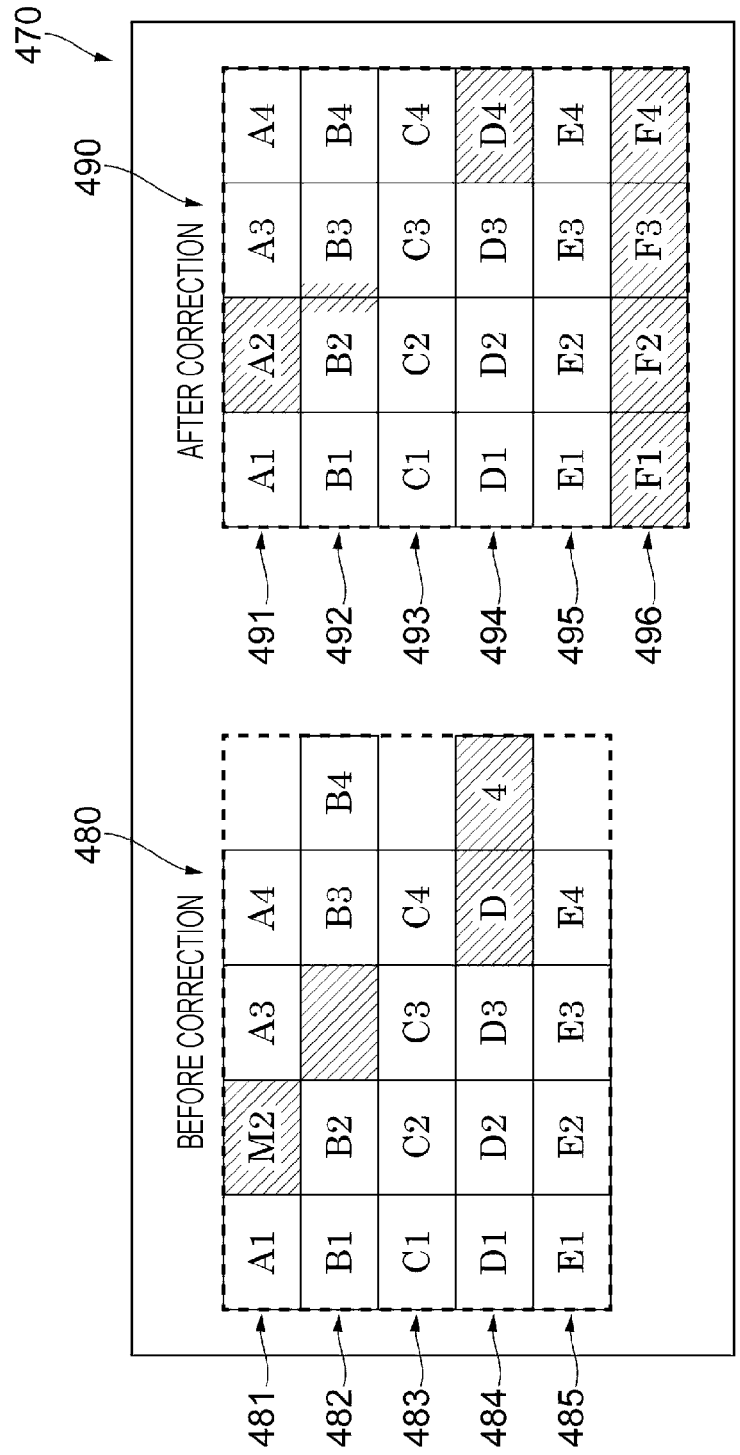
FIG. 5 is a diagram illustrating an example of a corrected checking screen displayed on the recognition result correction apparatus.

FIG. 5 is a diagram illustrating an example of the correction confirmation screen 470 displayed on the recognition result correction apparatus 30. The correction confirmation screen 470 includes an uncorrected table recognition result 480 and a corrected table recognition result 490. The recognition result correction apparatus 30 highlights parts that are changed by correction in the uncorrected table recognition result 480 and the corrected table recognition result 490. In FIG. 5, highlighting is represented by diagonal hatching.

Specifically, characters "M2" in the second cell of an uncorrected row recognition result 481 of the uncorrected table recognition result 480 are changed to characters "A2" in the second cell of a corrected row recognition result 491 of the corrected table recognition result 490. Thus, this cell is highlighted in the uncorrected table recognition result 480 and the corrected table recognition result 490.

Furthermore, a cell in which no character is set in an uncorrected row recognition result 482 of the uncorrected table recognition result 480 is deleted in a corrected row recognition result 492 of the corrected table recognition result 490. Thus, the deleted cell and a part where the deleted cell was present are highlighted in the uncorrected table recognition result 480 and the corrected table recognition result 490, respectively.

Moreover, a cell in which a character "D" is set and a cell in which a character "4" is set in an uncorrected row recognition result 484 of the uncorrected table recognition result 480 are merged into a cell in which characters "D4" are set in a corrected row recognition result 494 of the corrected table recognition result 490. Thus, the two cells before merging and the single cell into which the two cells are merged are highlighted in the uncorrected table recognition result 480 and the corrected table recognition result 490, respectively.

Furthermore, although there is no row region below an uncorrected row recognition result 485 of the uncorrected table recognition result 480, a corrected row recognition result 496 is added to below a corrected row recognition result 495 of the corrected table recognition result 490. Thus, the corrected row recognition result 496 is highlighted in the corrected table recognition result 490.

Although the uncorrected table recognition result 480 is displayed along with the corrected table recognition result 490 on the correction confirmation screen 470, the present disclosure is not limited to this arrangement. The uncorrected table recognition result 480 is not necessarily displayed along with the corrected table recognition result 490, and only the corrected table recognition result 490 may be displayed.

Hardware Configuration of Recognition Result Correction Apparatus

Figure 6:
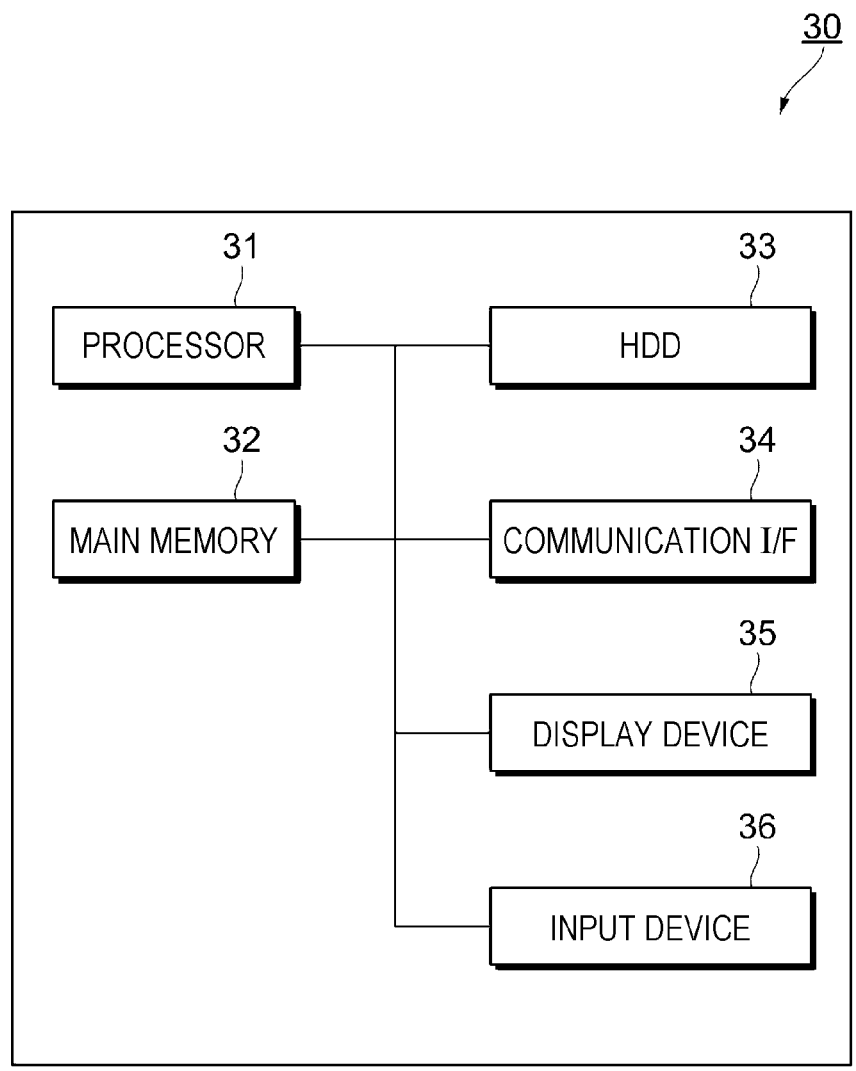
FIG. 6 is a diagram illustrating an example of the hardware configuration of a recognition result correction apparatus according to an exemplary embodiment of the present disclosure.

FIG. 6 is a diagram illustrating an example of the hardware configuration of the recognition result correction apparatus 30 according to an exemplary embodiment. As illustrated in FIG. 6, the recognition result correction apparatus 30 includes a processor 31 as operation means and a main memory 32 and a hard disk drive (HDD) 33 as storing means. The processor 31 executes various types of software such as an operating system (OS) and applications and implements functions described later. The main memory 32 is a memory region in which the various types of software and data and the like used for execution of the various types of software are stored. The HDD 33 is a memory region in which input data to be input to the various types of software, output data output from the various types of software, and the like are stored. The recognition result correction apparatus 30 also includes a communication interface (I/F) 34 for performing communication with the outside of the recognition result correction apparatus 30, a display device 35 such as a display, and an input device 36 such as a keyboard and a mouse.

Functional Configuration of Recognition Result Correction Apparatus

Figure 7:
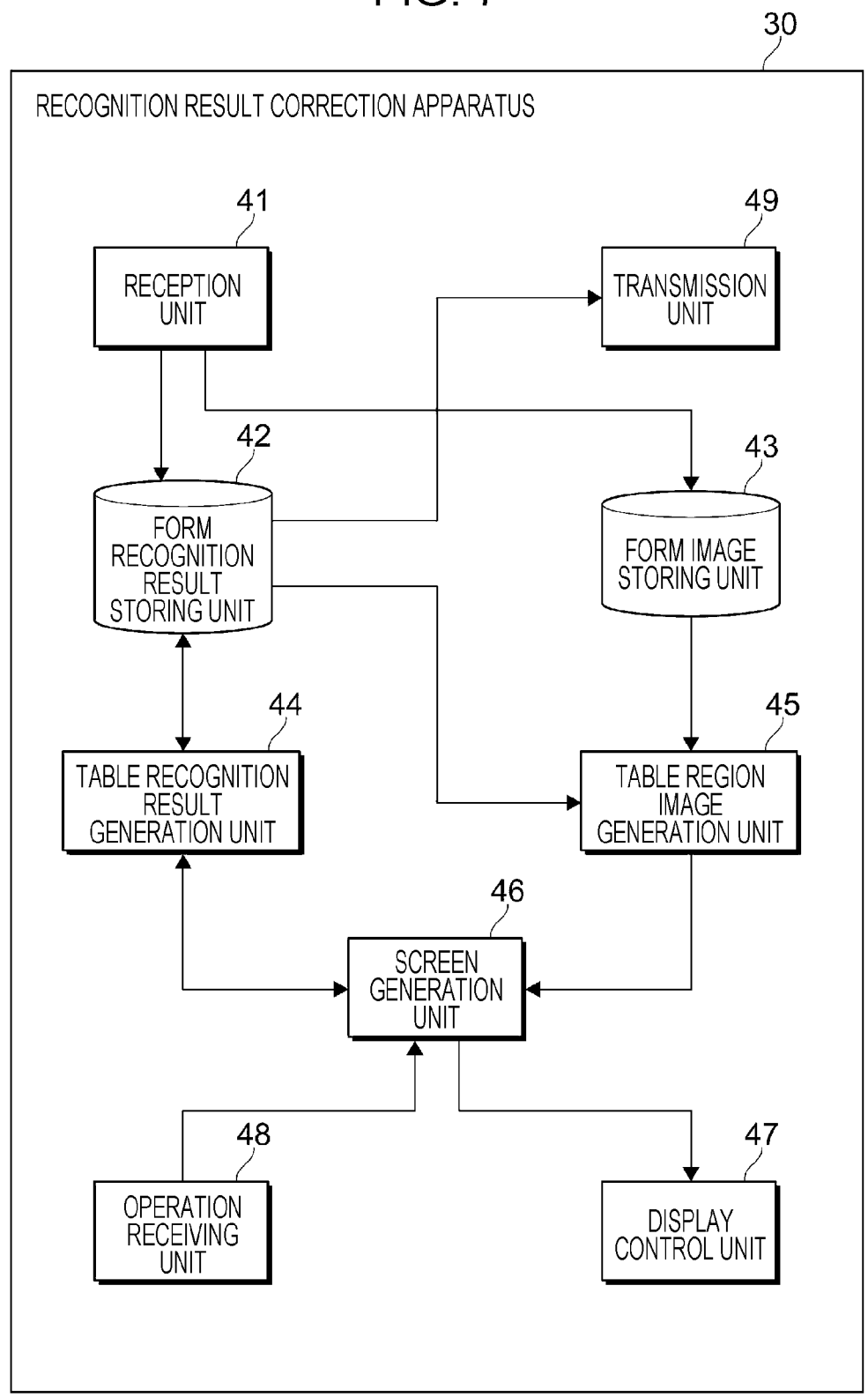
FIG. 7 is a block diagram illustrating an example of the functional configuration of a recognition result correction apparatus according to an exemplary embodiment of the present disclosure.

FIG. 7 is a block diagram illustrating an example of the functional configuration of the recognition result correction apparatus 30 according to an exemplary embodiment. The recognition result correction apparatus 30 according to an exemplary embodiment is an example of an information processing apparatus. As illustrated in FIG. 7, the recognition result correction apparatus 30 includes a reception unit 41, a form recognition result storing unit 42, a form image storing unit 43, a table recognition result generation unit 44, a table region image generation unit 45, a screen generation unit 46, a display control unit 47, an operation receiving unit 48, and a transmission unit 49.

The reception unit 41 receives the form recognition result 410 from the form recognition apparatus 20. The reception unit 41 also receives the form image 430 from the image reading apparatus 10.

The form recognition result storing unit 42 stores the form recognition result 410 received by the reception unit 41.

The form image storing unit 43 stores the form image 430 received by the reception unit 41.

As illustrated in FIGS. 2A and 2B, the table recognition result generation unit 44 generates the table recognition result 420 based on the form recognition result 410 stored in the form recognition result storing unit 42. In an exemplary embodiment, the table recognition result 420 is used as a recognition result of a table image containing a table, and the table recognition result generation unit 44 is provided as an example of means for acquiring the recognition result of the table image.

As described later, when a corrected row recognition result is transmitted to the table recognition result generation unit 44 from the screen generation unit 46, the table recognition result generation unit 44 corrects the form recognition result 410 stored in the form recognition result storing unit 42 on the basis of contents of the corrected row recognition result.

As illustrated in FIGS. 3A and 3B, the table region image generation unit 45 cuts out the table region image 440, based on coordinates of a table region stored in the form recognition result storing unit 42, from the form image 430 stored in the form image storing unit 43. In this processing, the table region image generation unit 45 also cuts out a row region image for each row from the table region image 440.

Furthermore, when the form recognition result 410 stored in the form recognition result storing unit 42 is corrected on the basis of contents of the corrected row recognition result, the table region image generation unit 45 cuts out a row image, based on coordinates of the corrected row in the form recognition result 410.

The screen generation unit 46 generates the correction screen 450 for correcting the table recognition result 420, on the basis of the table region image 440 generated by the table region image generation unit 45 and the table recognition result 420 generated by the table recognition result generation unit 44. Specifically, as illustrated in FIG. 4A, the correction screen 450 on which row region images cut out from the table region image 440 and row recognition results cut out from the table recognition result 420 are arranged in an alternate manner is generated. In an exemplary embodiment, the correction screen 450 is used as an example of a screen on which a table image and a recognition result are arranged for each row of the table in an alternate manner, and the screen generation unit 46 is provided as an example of means for performing control such that this screen is displayed.

As illustrated in FIG. 4A, the screen generation unit 46 identifies a part of the table recognition result 420 in which an inconsistency is present, and highlights the part including the inconsistency on the correction screen 450. In an exemplary embodiment, the screen generation unit 46 is provided as an example of means for performing control such that a part including an inconsistency between the row structure in a table image and the row structure in a recognition result is displayed in a manner different from the other parts.

The part including the inconsistency may be identified using, for example, methods described below.

In a first method, in a case where the number of columns of a table is different from the number of columns in a row of the table recognition result 420, the row is identified as a part including an inconsistency. The number of columns of the table may be specified by a user operation received by the operation receiving unit 48. In this case, the screen generation unit 46 is an example of means for identifying a part including an inconsistency on the basis of the number of columns of a table input by an operator. Alternatively, the number of columns of a table may be acquired by analyzing the table recognition result 420. For example, in the case where the numbers of columns in a predetermined number of rows or more of the table recognition result 420 are the same, the number of columns may be defined as the number of columns of the table. In this case, the screen generation unit 46 is an example of means for identifying a part including an inconsistency on the basis of the number of columns of a table acquired by analyzing a recognition result.

In a second method, in the case where the reliability of a recognition result of characters in a cell in the table recognition result 420 is equal to or less than a predetermined threshold, the cell is identified as a part including an inconsistency.

Furthermore, when the operation receiving unit 48 receives a user operation for correcting the table recognition result 420 on the correction screen 450, the screen generation unit 46 generates the correction screen 450 on which the table recognition result 420 is corrected. Specifically, as illustrated in FIG. 4B, the screen generation unit 46 generates the correction screen 450 on which row images cut out by the table region image generation unit 45 and corrected row recognition results are arranged alternately. In an exemplary embodiment, a corrected row recognition result is used as an example of a corrected recognition result obtained by correcting a recognition result, and the screen generation unit 46 is provided as an example of means for performing control such that a corrected recognition result is displayed in accordance with an operation performed by an operator for correcting a recognition result. Then, the screen generation unit 46 notifies the table recognition result generation unit 44 of the corrected row recognition result.

Furthermore, as illustrated in FIG. 5, the screen generation unit 46 may generate the correction confirmation screen 470 on which no row images are arranged and only corrected row recognition results are arranged. In this case, the screen generation unit 46 is an example of means for performing control such that an image cut out from a table image is not displayed when a corrected recognition result is displayed. Furthermore, as illustrated in FIG. 5, the screen generation unit 46 may generate the correction confirmation screen 470 on which the uncorrected table recognition result 480 is arranged along with the corrected table recognition result 490. In this case, the screen generation unit 46 is an example of means for performing control such that an uncorrected recognition result is displayed along with a corrected recognition result when the corrected recognition result is displayed. Moreover, the screen generation unit 46 may highlight changed parts in the uncorrected table recognition result 480 and the corrected table recognition result 490 on the correction confirmation screen 470. In this case, the screen generation unit 46 is an example of means for performing control such that an uncorrected recognition result is displayed along with a corrected recognition result when the corrected recognition result is displayed.

The display control unit 47 controls the display device 35 to display the correction screen 450 and the correction confirmation screen 470 generated by the screen generation unit 46.

The operation receiving unit 48 receives a user operation for correcting a table recognition result on the correction screen 450. Furthermore, the operation receiving unit 48 may receive a user operation for specifying the number of columns of a table in a form.

When the recognition result correction apparatus 30 learns that the form recognition result 410 stored in the form recognition result storing unit 42 does not need to be corrected or after correction of the form recognition result 410 is completed, the transmission unit 49 transmits the form recognition result 410 to the form processing apparatus 50.

Operation of Recognition Result Correction Apparatus

In the recognition result correction apparatus 30 according to an exemplary embodiment, the reception unit 41 first receives the form recognition result 410 from the form recognition apparatus 20 and stores the form recognition result 410 into the form recognition result storing unit 42, and the reception unit 41 receives the form image 430 from the image reading apparatus 10 and stores the form image 430 into the form image storing unit 43. Then, the recognition result correction apparatus 30 generates and displays the correction screen 450 for correcting the form recognition result 410 stored in the form recognition result storing unit 42.

Figure 8:
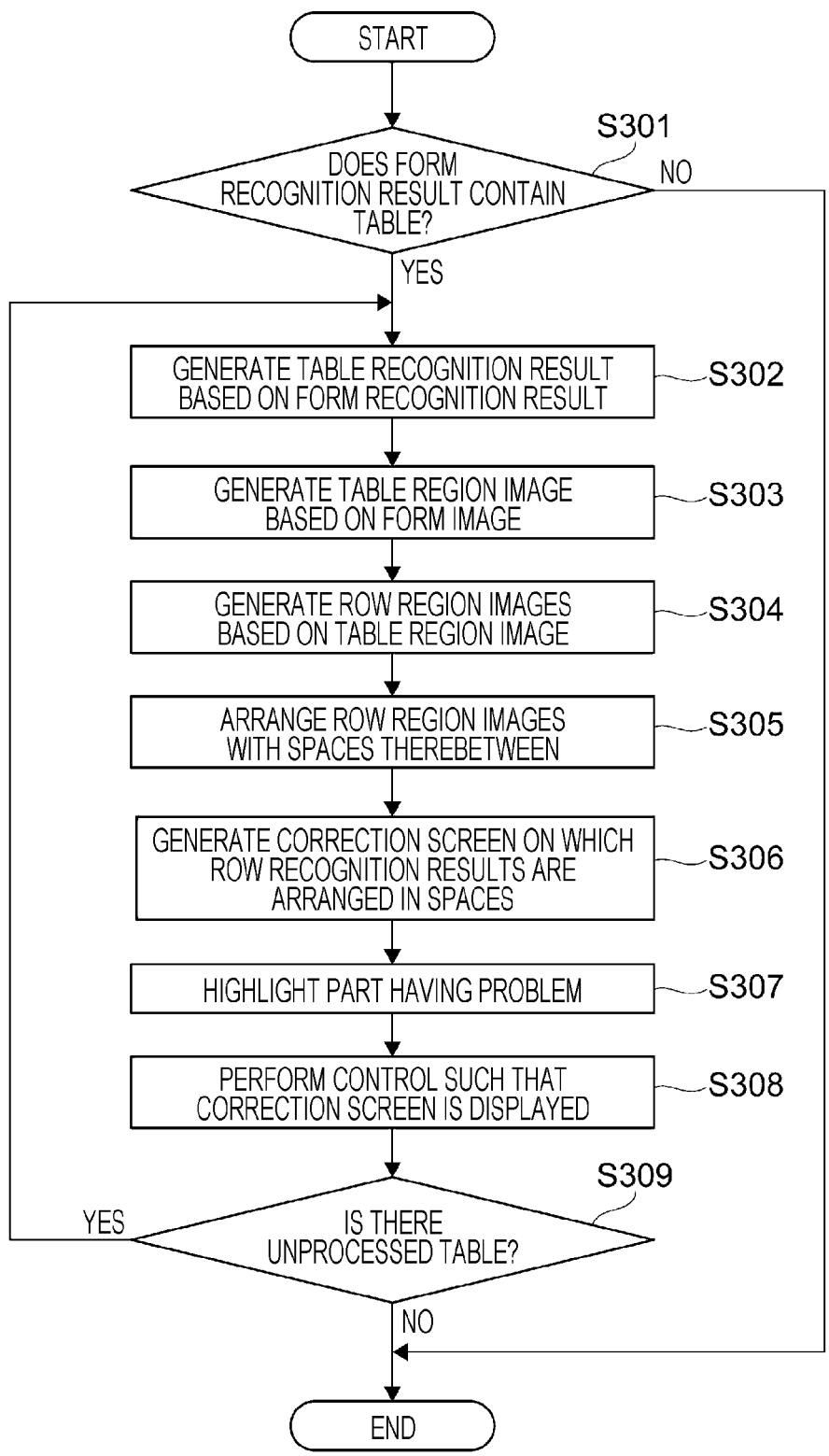
FIG. 8 is a flowchart illustrating an example of an operation of a recognition result correction apparatus according to an exemplary embodiment of the present disclosure.

FIG. 8 is a flowchart illustrating an example of a process performed by the recognition result correction apparatus 30 at this time. In the flowchart of FIG. 8, attention is paid to, out of various corrections on the form recognition result 410, an operation on the correction screen 450 for correcting the table recognition result 420.

As illustrated in FIG. 8, in the recognition result correction apparatus 30, the table recognition result generation unit 44 first determines whether or not the form recognition result 410 stored in the form recognition result storing unit 42 contains a table (step S301).

In the case where it is determined that the form recognition result 410 does not contain a table, the table recognition result generation unit 44 ends the process.

In the case where it is determined that the form recognition result 410 contains a table, the table recognition result generation unit 44 generates the table recognition result 420 based on the form recognition result 410 (step S302).

Next, the table region image generation unit 45 generates the table region image 440 based on the form image 430 stored in the form image storing unit 43 (step S303). Specifically, by cutting out, based on coordinates of a table region stored in the form recognition result storing unit 42, from the form image 430 stored in the form image storing unit 43, the table region image generation unit 45 generates the table region image 440.

Then, the table region image generation unit 45 generates row region images based on the table region image 440 generated in step S303 (step S304). Specifically, by cutting out from the table region image 440 for individual rows, the table region image generation unit 45 generates the row region images.

The table region image generation unit 45 rearranges the row region images generated in step S304 with spaces therebetween (step S305).

Next, by arranging row recognition results in the spaces generated in the rearrangement of the row region images in step S305, the screen generation unit 46 generates the correction screen 450 (step S306). The row recognition results are obtained by dividing the table recognition result 420 generated in step S302 in units of rows.

Then, the screen generation unit 46 highlights a part having a problem on the correction screen 450 generated in step S306 (step S307). Specifically, in the case where the number of columns of the table is different from the number of columns in a row of the table recognition result 420, the screen generation unit 46 highlights the row as a part having a problem. Alternatively, in the case where the reliability of a recognition result of characters in a cell in the table recognition result 420 is equal to or less than a predetermined threshold, the cell is identified as a part having a problem.

Next, the display control unit 47 controls the display device 35 to display the correction screen 450, which is generated in step S306, on which the part having a problem is highlighted in step S307 (step S308).

Then, the table recognition result generation unit 44 determines whether or not there is an unprocessed table in the form recognition result 410 (S309).

In the case where it is determined that there is an unprocessed table in the form recognition result 410, the table recognition result generation unit 44 causes the process to return to step S302 and performs the processing of steps S302 to S308 for the table.

In the case where it is determined that there is no unprocessed table in the form recognition result 410, the table recognition result generation unit 44 causes the process to end.

For example, a user operation for correcting a row recognition result is performed on the correction screen 450 displayed as described above. In this case, in the recognition result correction apparatus 30, the operation receiving unit 48 first receives the user operation. Then, the screen generation unit 46 notifies the table recognition result generation unit 44 of a corrected row recognition result obtained by correcting the row recognition result. Then, the table recognition result generation unit 44 corrects the form recognition result 410 stored in the form recognition result storing unit 42 on the basis of contents of the corrected row recognition result.

After the form recognition result 410 stored in the form recognition result storing unit 42 is corrected on the basis of the contents of the corrected row recognition result, the table region image generation unit 45 cuts out a row image based on coordinates of a row after the correction in the form recognition result 410 from the form image 430 stored in the form image storing unit 43. Next, the screen generation unit 46 generates the correction screen 450 on which the row image cut out by the table region image generation unit 45 and the corrected row recognition result are arranged alternately. Next, the display control unit 47 controls the display device 35 to display the correction screen 450.

Finally, the transmission unit 49 transmits the form recognition result 410 stored in the form recognition result storing unit 42 and corrected to the form processing apparatus 50. Alternatively, in the case where the form recognition result 410 does not need to be corrected, the transmission unit 49 directly transmits the form recognition result 410 stored in the form recognition result storing unit 42 to the form processing apparatus 50.

Program

The process performed by the recognition result correction apparatus 30 according to an exemplary embodiment is configured as a program such as application software or the like.

That is, a program implementing an exemplary embodiment is regarded as a program for causing a computer to implement a function for acquiring a recognition result of a table image containing a table and a function for performing control such that a screen on which a table image and a recognition result are arranged for each row or column of the table in an alternate manner.

A program implementing an exemplary embodiment is not only able to be provided by communication means but also able to be stored in a recording medium such as a compact disc-read only memory (CD-ROM) and provided.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire a recognition result of a table image containing a table; and
perform control such that a screen on which the table image and the recognition result are arranged for each row or column of the table in an alternate manner is displayed, wherein the control includes adding spaces between each row or column of the table image on the screen, and adding respective rows or columns of the recognition result in the spaces.

2. The information processing apparatus according to claim 1, wherein the processor performs control such that a part including an inconsistency between a structure of a row or a column in the table image and a structure of a row or a column in the recognition result is displayed in a mode different from other parts when the screen is displayed.

3. The information processing apparatus according to claim 2, wherein the processor identifies the part including the inconsistency in accordance with the number of columns or the number of rows of the table input by an operator.

4. The information processing apparatus according to claim 2, wherein the processor identifies the part including the inconsistency in accordance with the number of columns or the number of rows of the table obtained by analyzing the recognition result.

5. The information processing apparatus according to claim 1, wherein the processor performs control such that a corrected recognition result obtained by correcting the recognition result is displayed in accordance with an operation performed by an operator for correcting the recognition result.

6. The information processing apparatus according to claim 5, wherein the processor performs control such that an image cut out from the table image is not displayed when the corrected recognition result is displayed.

7. The information processing apparatus according to claim 5, wherein the processor performs control such that the recognition result that has not been corrected is displayed along with the corrected recognition result when the corrected recognition result is displayed.

8. The information processing apparatus according to claim 5, wherein the processor performs control such that a corrected part in the corrected recognition result is displayed in a mode different from other parts when the corrected recognition result is displayed.

9. An information processing apparatus comprising:
   means for acquiring a recognition result of a table image containing a table; and
   means for performing control such that a screen on which the table image and the recognition result are arranged for each row or column of the table in an alternate manner is displayed, wherein the means for performing control includes adding spaces between each row or column of the table image on the screen, and adding respective rows or columns of the recognition result in the spaces.

10. The information processing apparatus according to claim 1, wherein the control further includes highlighting text data in a part of the recognition result determined to have a predetermined problem with respect to corresponding data of the table image.

11. A non-transitory computer readable medium storing a program causing a computer to execute a process for information processing, the process comprising:
   acquiring a recognition result of a table image containing a table; and
   performing control such that a screen on which the table image and the recognition result are arranged for each row or column of the table in an alternate manner is displayed wherein the control includes adding spaces between each row or column of the table image on the screen, and adding respective rows or columns of the recognition result in the spaces.

* * * * *